(12) United States Patent
Suzuki et al.

(10) Patent No.: US 7,817,515 B2
(45) Date of Patent: Oct. 19, 2010

(54) OPTICAL DISK RECORDING/REPRODUCING APPARATUS AND ALTERNATION PROCESS METHOD THEREOF

(75) Inventors: Motoyuki Suzuki, Yokohama (JP); Kikuo Shimizu, Kawasaki (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 747 days.

(21) Appl. No.: 11/583,887

(22) Filed: Oct. 20, 2006

(65) Prior Publication Data
US 2007/0274182 A1 Nov. 29, 2007

(30) Foreign Application Priority Data
May 25, 2006 (JP) .............................. 2006-145246

(51) Int. Cl.
*G11B 20/18* (2006.01)
(52) U.S. Cl. .................................... 369/53.17
(58) Field of Classification Search ........................ None
See application file for complete search history.

(56) References Cited

U.S. PATENT DOCUMENTS

| 6,904,008 | B2 * | 6/2005 | Kawashima et al. ..... 369/47.15 |
| 7,184,377 | B2 | 2/2007 | Ito et al. |
| 7,428,196 | B2 * | 9/2008 | Blacquiere et al. ....... 369/47.28 |
| 2008/0219143 | A1 | 9/2008 | Ito et al. |

FOREIGN PATENT DOCUMENTS

| JP | 02-179970 | 7/1990 |
| JP | 2900387 | 3/1999 |
| JP | 2003-288759 | 10/2003 |
| JP | 2006-012321 | 1/2006 |
| JP | 2007317296 A * | 12/2007 |

* cited by examiner

*Primary Examiner*—Daniell L Negrón
*Assistant Examiner*—Parul Gupta
(74) *Attorney, Agent, or Firm*—Antonelli, Terry, Stout & Kraus, LLP.

(57) ABSTRACT

Within a disk recording/reproducing apparatus for improving a transfer rate when recording/reproducing, and an alternation process method for a disk for it, for recording or reproducing information onto/from an optical disk 100, while conducting a alternation on a defect block within a user data recording area into an alternation area, a controller 500 determines an alternation destination where data of an alternation origin are recorded therein, or a drive speed during the alternation process, upon basis of the position of the alternation origin on the optical disk, when conducting the alternation process. The alternation destination is determined upon basis of an intermediate position ($r_{mid}$) of the disk, when the optical disk includes alternation areas on an innermost periphery and an outermost periphery thereof, and when it is conducted with CAV recording, on the other hand it is determined upon basis of an inner/outer peripheral rotation speed average position ($r_{av}$) of the disk, when being conducted with CLV recording. Or, the drive speed during the alternation process is determined on the position of the alternation origin, upon basis of a drive speed inner peripheral rotation speed average position ($r_{int}$), when the optical disk includes the alternation area only on the innermost periphery thereof, and when it is conducted with CLV recording.

24 Claims, 6 Drawing Sheets

IN CASE WHEN ALTERNATION AREA
IS ONLY ON INNER PERIPHERY

IN CASE WHEN ALTERNATION AREAS
ARE ON INNER AND OUTER PERIPHERIES

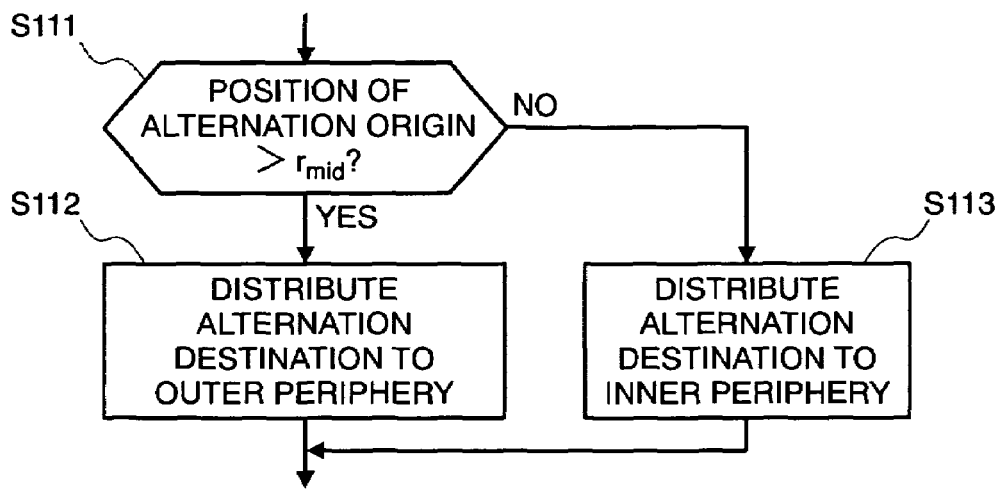
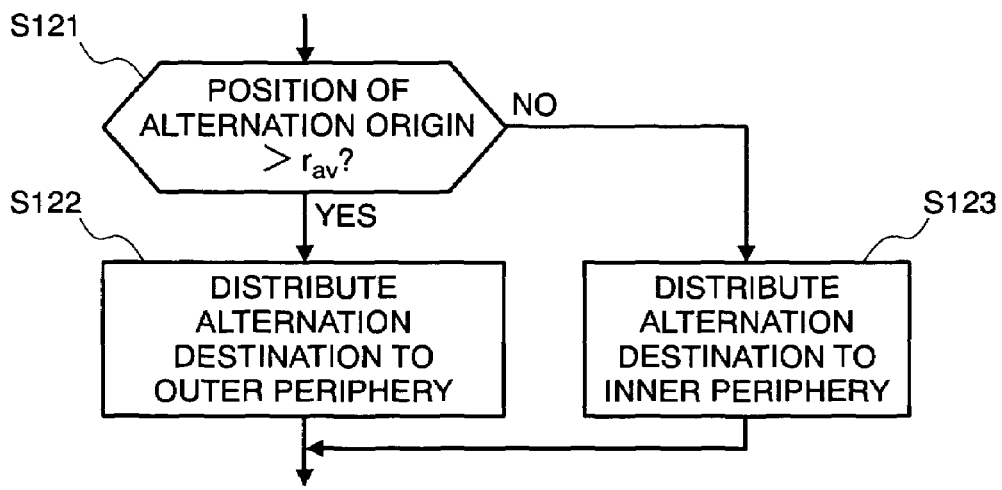
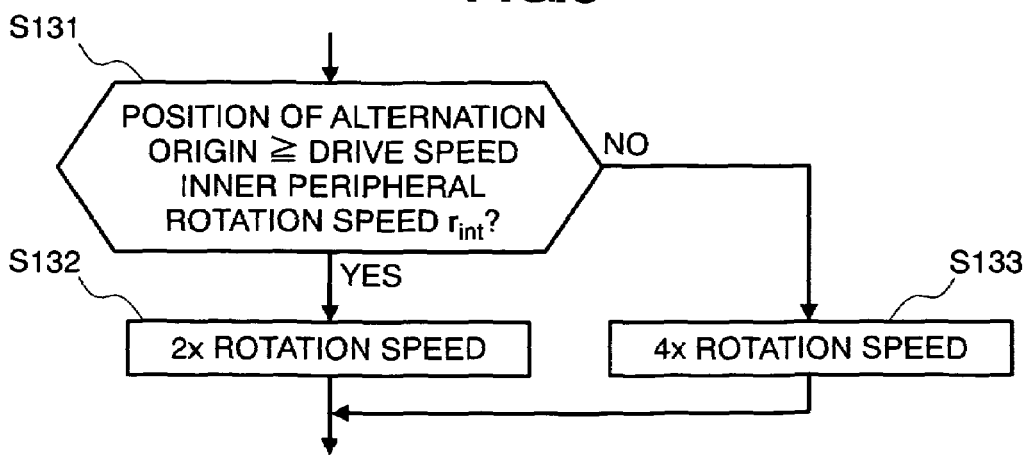

OPTICAL DISK RECORDING/REPRODUCING APPARATUS AND ALTERNATION PROCESS METHOD THEREOF

BACKGROUND OF THE INVENTION

The present invention relates to a disk recording/reproducing apparatus for recording/reproducing information onto/from a disc-like optical recording medium (hereinafter, being called by an "optical disk"), such as, a CD or a DVD, etc., and in particular, it relates to a disk recording/reproducing apparatus and an alternation process method thereof, for enabling to shorten a time for alternation process due to defects or the like, and further, to achieve an improvement on deterioration of transfer rate when conducting the recording/reproducing.

An optical disk apparatus for recording/reproducing information, by applying the optical disk as a recording medium therein, is widely used to be an information recording apparatus within various kinds of electronic apparatuses, such as, a personal computer, for example. In particular, in recent years, various kinds of DVDs are spread or popularized widely, in addition to the conventional CDs. Also, a recording medium having further large memory capacity, such as, a BD is now on the way of commercialization thereof. Accompanying with that, a requirement is made for a disk recording/reproducing apparatus, which is compatible or deal with those various kinds of optical disks.

In particular, with the DVD and BD, for the purpose of keeping reliability with respect to disk defects when recording information thereon, as well as, an increase of an amount of recording information of the medium, a so-called "verify process" is conducted thereon, i.e., examining the sameness between the data read out by a predetermined block unit and that of the origin thereof, successively, while recording the user data thereon. And, if determining that they are not same or identical to each other, that block is recognized to be the defect block, and it is necessary to conduct a process, being so-called an alternation process (or, substitution), i.e., recording that data recorded into a region or an area (i.e., an alternation area) other than the user area for recording the user data therein on the optical disk. For example, in the following Patent Document 1 is described a technology of dividing the disc-like information recording medium into plural numbers of zones, each of which includes plural tracks therein, into a radial direction of rotation thereof, so as to provide an alternation area and an alternation management area for managing the said alternation areas, for each of the zones, thereby conducting the recording or the reproducing with keeping the rotation speed of that disc-like information recording medium constant, while changing the rotation speed thereof for each of the said zones, and on the other hand, no change is made on the rotation speed of the disc-like information recording medium when conducting the alternation process.

Also, in the following Patent Document 2 is described a technology of determining on whether the disk rotation speed at the disk radial position of the defect block lies within a range of a reference speed or not, when conducting the alternation process, and upon a result of that determination, the rotation speed of the disk is set up or controlled at least to be within the range of the reference speed, thereby suppressing a difference of the rotation speeds of the disk, i.e., between that within the area for user data and that within the alternation area. In this manner, executing the disk rotation speed control, separately, between in the user data area and in the alternation area, enables to suppress the difference in the disk rotation speed while maintaining a quick response.

[Patent Document 1] Japanese Patent No. 2900389; and
[Patent Document 2] Japanese Patent Laying-Open No. 2006-12321 (2006).

However, with such the conventional arts as was mentioned above, although the consideration was paid upon the rotation speeds of the disk within the user data recording area and the alternation area, for the purpose of maintaining the quick response of the apparatus, however no mentioning is made about determination of the alternation area in the alternation process mentioned above. Thus, with the conventional arts, the determination is made automatically, but not depending upon the recording position of the origin of alternation (i.e., the position of the disk defect), in particular, even when determining of the alternation area on the disk, which has the alternation areas on both the innermost peripheral position and the outermost peripheral position. For that reason, it takes a long time for the alternation process of necessarily carrying out the movement of the pickup and further the control of the disk rotation speed, accompanying inertia therein, and therefore it cannot say that it is a suitable process for shortening the time of the alternation process.

Also, no consideration was paid upon the position of recording the origin of alternation (i.e., a destination of alternation) when determining the rotation speed of the disk within the alternation area, even on the disk having the alternation area only on the innermost peripheral position thereof.

BRIEF SUMMARY OF THE INVENTION

Then, according to the present invention, taking the drawbacks within the conventional arts mentioned above into the consideration thereof, an object thereof is to provide a disk recording/reproducing apparatus, for enabling to further shorten the time necessary for the alternation process, depending upon the position of the origin of alternation when conducting the alternation process, and also a method of the alternation process on the disk for that.

Thus, according to the present invention, as will be mentioned in details, it is achieved upon the basis of acknowledgement about an importance of controlling the destination of alternation and the rotation speed of the disk, appropriately, also including the position of the disk defect, being the position where the origin of alternation is recorded, when conducting the alternation process.

According to the present invention, for accomplishing the object mentioned above, first of all, there is provided a disk recording/reproducing apparatus, for recording or reproducing information onto an optical disk, with conducting an alternation process upon a defect block within a user data recording area on said optical disk, comprising: a disk motor for rotationally driving said optical disk; a disk motor driver circuit for driving said disk motor; an optical pickup for irradiating a light upon a recording surface of said optical disk and for receiving a reflection light thereof, so as to conduct recording or reproducing of data onto the recording surface of said optical disk; a slide motor for moving said optical pickup into a radial direction of said optical disk; a slide motor controller circuit for driving said slide motor; and a controller for controlling at least said disk motor driver circuit and said slide motor controller circuit upon basis of a signal obtained from said optical pickup, wherein said controller determines an alternation destination for recording data at an alternation origin therein or a drive speed during the alternation process depending on a position of the alternation origin on said optical disk, when it conducts the alternation process upon detection of a defect block within a user data recording area on said optical disk, thereby conducting the alternation process thereon.

Also, according to the present invention, within the disk recording/reproducing apparatus, as is described in the above preferably, said controller determines said alternation destination for recording data at an alternation origin therein, depending on the position of said alternation origin, upon basis of an intermediate position ($r_{mid}$) of said disk, when said optical disk loaded into said apparatus has said alternation areas on an innermost periphery and an outermost periphery thereof, and when it is conducted with CAV (Constant Angular Velocity) recording thereon, or said controller determines said alternation destination for recording data at an alternation origin therein, depending on the position of said alternation origin, upon basis of an inner/outer periphery rotation speed average position ($r_{av}$) of said disk, when said optical disk loaded into said apparatus has said alternation areas on an innermost periphery and an outermost periphery thereof, and when it is conducted with CLV (Constant Liner Velocity) recording thereon, or said controller determines the drive speed during said alternation process, depending on the position of said alternation origin, upon basis of a drive speed inner periphery rotation speed average position ($r_{int}$) of said disk, when said optical disk loaded into said apparatus has said alternation area only on an innermost periphery thereof, and when it is conducted with CLV recording thereon.

In addition to the above, according to the present invention, also for accomplishing the object mentioned above, there is further provided an alternation process method for an optical disk, enabling to record data in a defect block within a user data recording area of said disk into an alternation area thereof, comprising the following steps of: a step of obtaining a position of an alternation origin on said optical disk, when detecting the defect block within the user data recording area of said disk; a step of determining an alternation destination where the data of said alternation origin are recorded therein, or a drive speed during said alternation process, upon basis of a position of the alternation origin on said optical disk, being obtained in the above-mentioned step; and a step of conducting said alternation process at said alternation destination, or at the drive speed during said alternation process, being determined in the above-mentioned step.

Also, according to the present invention, within the alternation process method for an optical disk, as is described in the above, preferably, said alternation destination for recording data at an alternation origin therein is determined depending on the position of said alternation origin, upon basis of an intermediate position ($r_{mid}$) of said disk, when said optical disk loaded into an apparatus has said alternation areas on an innermost periphery and an outermost periphery thereof, and when it is conducted with CAV recording thereon, or said alternation destination for recording data at an alternation origin therein is determined depending on the position of said alternation origin, upon basis of an inner/outer periphery rotation speed average position ($r_{av}$) of said disk, when said optical disk loaded into said apparatus has said alternation areas on an innermost periphery and an outermost periphery thereof, and when it is conducted with CLV recording thereon, or the drive speed during said alternation process is determined depending on the position of said alternation origin, upon basis of a drive speed inner periphery rotation speed average position ($r_{int}$) of said disk, when said optical disk loaded into said apparatus has said alternation area only on an innermost periphery thereof, and when it is conducted with CLV recording thereon.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIG. 4 is a flowchart for showing an example of details of an alternation process "A" in the flowchart shown in FIG. 3;

FIG. 5 is a flowchart for showing an example of details of an alternation process "B" in the flowchart shown in FIG. 3;

FIG. 6 is a flowchart for showing an example of details of an alternation process "C" in the flowchart shown in FIG. 3;

DETAILED DESCRIPTION OF THE INVENTION

Hereinafter, embodiments according to the present invention will be fully explained by referring to the attached drawings.

Figure 1:
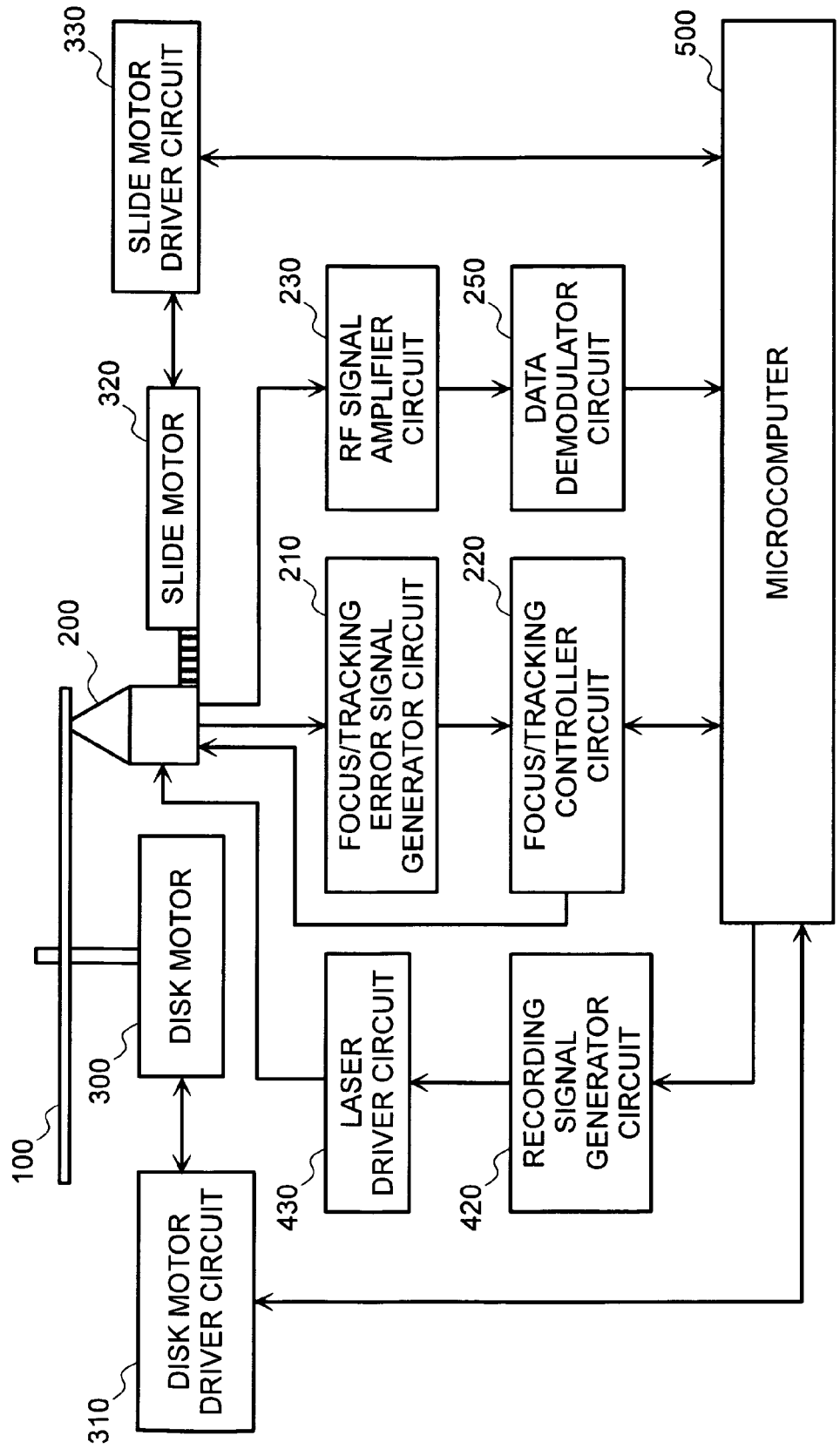
FIG. 1 is a perspective view for showing the entire structures of the disk recording/reproducing apparatus, according to an embodiment of the present invention.

First of all, FIG. 1 attached herewith shows internal structures of the disk recording/reproducing apparatus, according to an embodiment of the present invention, briefly, wherein a reference numeral 100 depicts so-called a disc-like optical recording medium (i.e., an optical disk), such as, a DVD-RAM, etc., being loaded or inserted into that disk recording/reproducing apparatus, so as to record or reproduce information onto/from it.

Also, a reference numeral 300 in the figure depicts a disk motor, for rotationally driving the optical disk 100 mentioned above, and as is apparent from the figure, at a tip of which is attached a turntable (not shown in the figure) for loading the optical disk 100 thereon, thereby rotationally driving that optical disk at a desired rotation speed. This motor 300 is driven through a disk motor driver circuit 310, as a driving means thereof. Thus, the optical disk 100 loaded on the turntable of the disk motor 300 is controlled, appropriately, in the rotation speed thereof, by means of the disk motor driver circuit 310, under a known constant angular velocity (CAV) method or a constant linear velocity (CLV) method.

Next, a reference numeral 200 in the figure depicts so-called an optical pickup, being attached in a movable manner into the radius direction of the optical disk 100, for irradiating a laser beam upon the recording surface thereof and for receiving a laser beam reflected upon that recording surface. However, within an inside of this optical pickup 200, though not mentioned in details thereof, an electric signal is reproduced from the reflected laser beam mentioned above, and the signal reproduced is outputted into a focus/tracking error signal generator circuit 210 shown in the figure, wherein a focus error signal and a tracking error signal are produced upon basis of that signal, for example. And, upon basis of the focus error signal and the tracking error signal outputted from this focus/tracking error signal 210, a focus/tracking controller circuit 220 generates a control signal, to be inputted into the optical pickup 200 mentioned above, and thereby controlling the position of an objective lens (not shown in the figure), which is provided to be movable within the optical pickup.

However, it is same to that in the conventional art, that a laser diode (not shown in the figure), being a light source of the laser beam, which is provided within an inside of the optical pickup 200 mentioned above is driven by means of a laser driver circuit 430, which supplies driving current upon basis of an output from a recording signal generator circuit 420 for generating a recording signal shown in the figure, and also that an intensity of the light generation is controlled thereon.

Also, among the electric signals, which are reproduced from the reflected laser beam within the inside of the optical pickup 200 mentioned above, so-called a RF signal is transferred to a RF signal amplifier circuit 230, and further the RF signal amplified therewith is outputted into a data demodulator circuit 250 for conducting demodulating process on it therein.

Further, onto the optical pickup 200 mentioned above is attached a slide motor 320 for moving that pickup into the radial direction of the optical disk 100, and this slide motor 320 is controlled by means of a slide motor driver circuit 330 for controlling and driving it. And, in this figure, a reference numeral 500 depicts a control means provided for controlling the disk motor driver circuit 310, the recording signal generator circuit 420, the focus/tracking controller circuit 220, the slide motor driver circuit 330, etc., and it is built up with a microcomputer, for example.

Figure 2A:
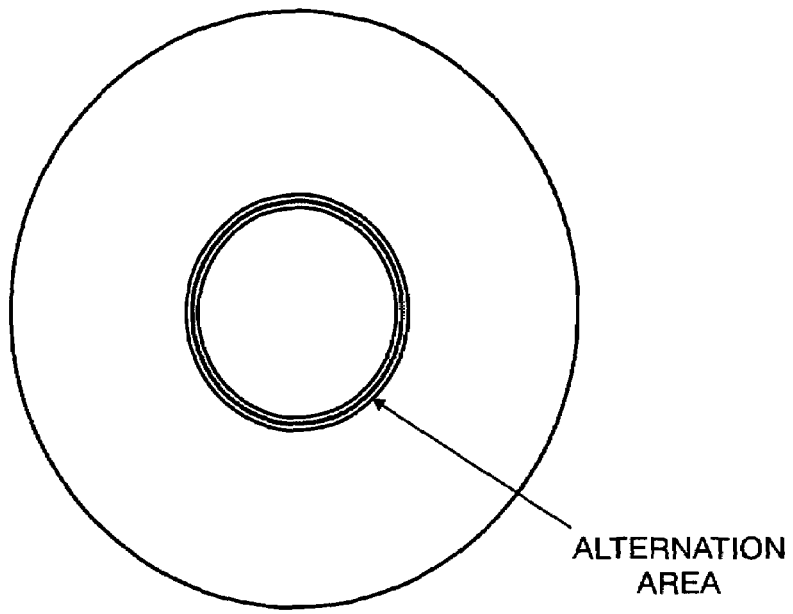
FIG. 2(A) and 2(B) are view for showing the position(s) of alteration area(s) on an optical disk, which can be loaded on the disk recording/reproducing apparatus.
Figure 2B:
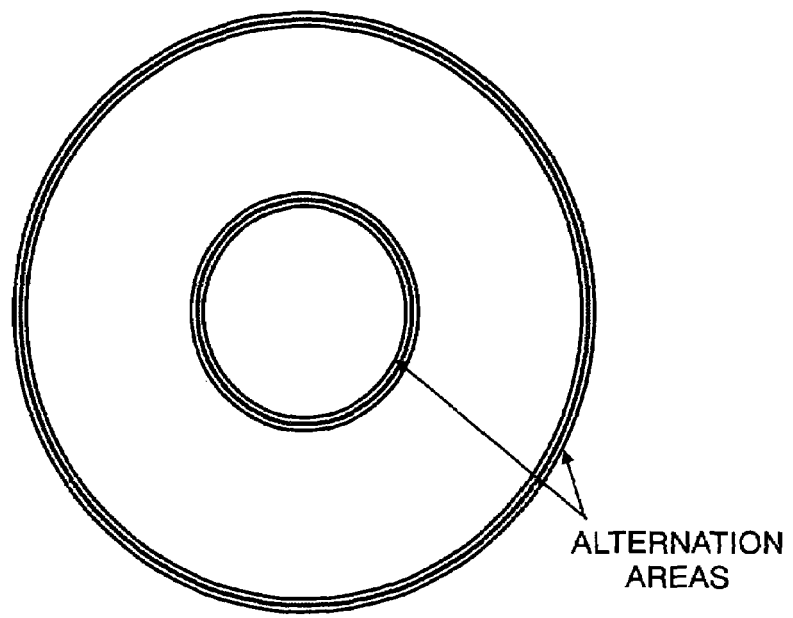

On the other hand, upon the optical disk 100 mentioned above, so-called an alternation process is conducted, i.e., the information to be recorded is recorded, shifting from that origin of alteration (hereinafter, "alternation origin"), onto other place, such as, destination of alternation (hereinafter, "alternation destination") (e.g., the alternation area), accompanying with disk defect caused due to adhesion of a finger print or a cut on the recording surface thereof, for example. In that case, as is shown in FIG. 2(A) or 2(B), the optical disk can be classified, roughly, into two (2) kinds, i.e., one having the alternation areas at both the innermost peripheral position and the outermost peripheral position, and one having the alternation area only at the innermost peripheral position or the outermost peripheral position, depending upon the differences in the kind and the method thereof. And, it has so-called a user data recording area, where a user can record the data therein, between those areas at the innermost and outermost peripheral positions, or in an outer periphery of the innermost peripheral position.

Following to the above, within the structures mentioned above, recording of the user data (i.e., the information) is carried out while moving the optical pickup 200 from an inner peripheral side to an outer peripheral side of the optical disk 100. In more details, the microcomputer 500 executes it while rotating the disk motor 300 at a predetermined drive speed (a double-speed, a quad-speed, etc.) and a method (for example, the CAV and CLV) through the disk motor driver circuit 310.

Thus, within the user data recording area of the optical disk 100 mentioned above, the user data is recorded through conducting the recording operation under condition of the predetermined rotation speed, appropriately, while reading out that data recorded by a unit of one (1) piece or plural pieces of blocks, sequentially, thereby verifying on the sameness between the original data (i.e., the verify process). As a result of this, if determining that those data are not same to each other, then that block(s) are acknowledged to be a defect block(s), so that the microcomputer 500 execute the control for the alternation process, upon basis of the result of that detection. In more details thereof, making the optical pickup 200 move to any one of the alternation areas fitting thereto, i.e., the outermost peripheral side or the innermost peripheral side of the disk, the microcomputer 500 records the contents of data of that defect block(s) into the alternation area so as to assign the defect block(s) into that alternation area, and records necessary system management information into a management area thereon.

And, according to the present invention, in particular, on the disk having the alternation areas at the innermost peripheral position and the outermost peripheral position (see FIG. 2(B) mentioned above), the alternation destination thereof is determined or distributed to one of the alternation areas, i.e., the inner periphery or the outer periphery, depending upon the recording position of the alternation origin, on the other hand, on the disk having the alternation area only at the innermost peripheral position (see FIG. 2(A) mentioned above), and in particular, in case when the recording is conducted under the condition of the constant linear velocity (CLV) method within the disk recording/reproducing apparatus, the recording speed within the alternation area on the inner periphery is determined also upon the recording position of that alternation origin, appropriately; thereby shortening the time for the alternation process.

Figure 3:
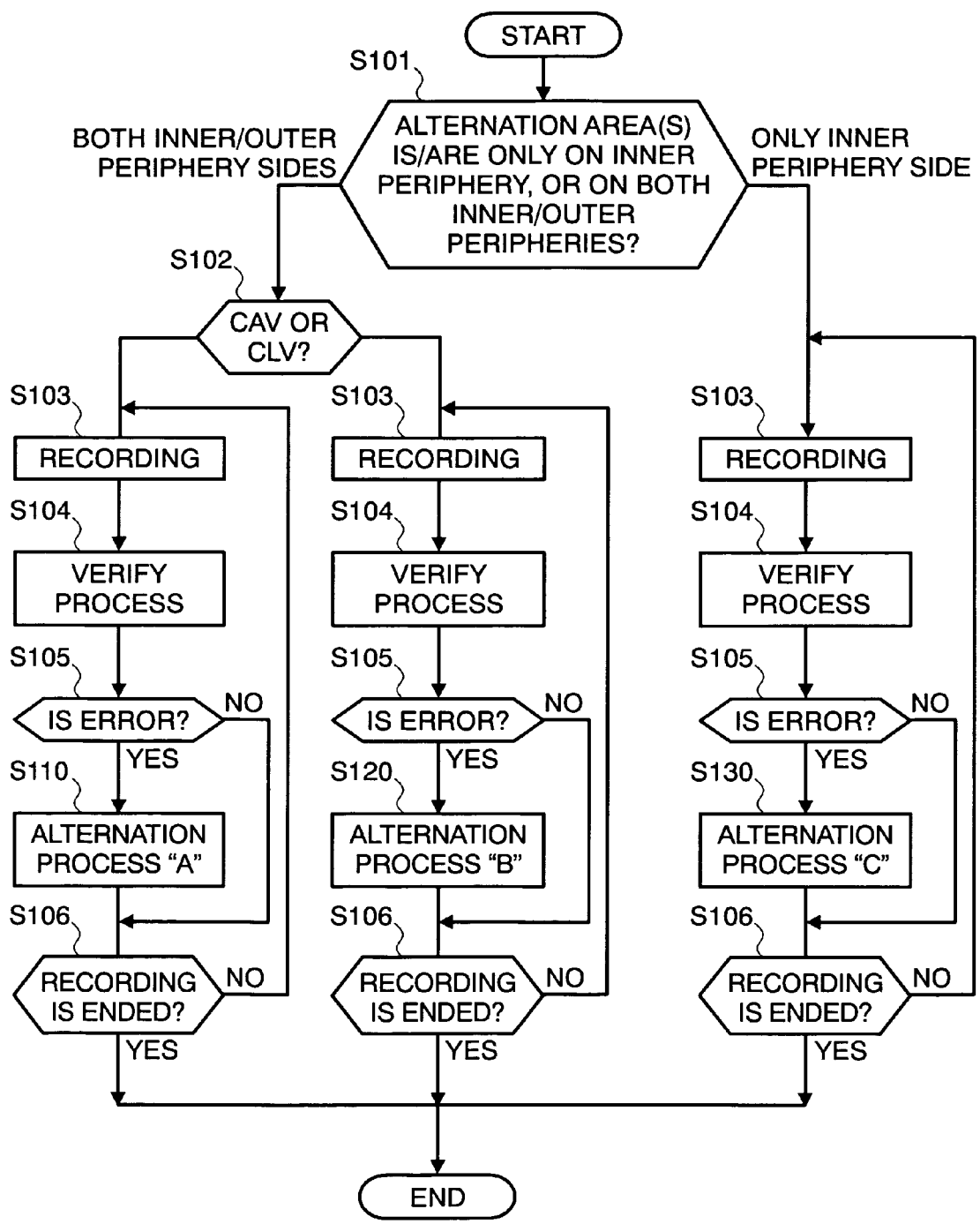
FIG. 3 is a flowchart for showing steps when the disk recording/reproducing apparatus conducts the recording operation.

Following to the above, FIG. 3 attached herewith shows the operation when the user data is recorded, being executed by the disk recording/reproducing apparatus mentioned above. First, when the optical disk 100 is loaded into the apparatus, the process is started, and determination is made on whether the alternation area of the optical disk 100 loaded into the apparatus is provided only on the inner periphery (i.e., the innermost peripheral position), or are provided on both inner/outer peripheral sides (i.e., the innermost peripheral position and the outermost peripheral position) (step S101). As a result, when it is determined that the alternation areas are provided on "inner/outer peripheral sides", further it is determined on whether the recording is conducted under the CAV method or the CLV method in the place thereof (step S102), when the apparatus conducts the recording onto that optical disk 100.

As a result, in case when the optical disk 100, onto which recording of the user data should be conducted, is provided with the alternation areas on the both inner/outer periphery sides (i.e., the innermost peripheral position and the outermost peripheral position) (see FIG. 2(B) mentioned above), and further, when the speed control is conducted under the CAV method, as is shown in the left-hand side in FIG. 3, first recording of the user data is conducted (step S103), and thereafter, the verify process mentioned above is conducted (step S104), so as to determine on whether an error exists or not (step S105). Thus, when it is decided that the data are same to each other (i.e., there is no error ("NO")) in this determination, then it is further determined on whether the recording process is completed or not (i.e., if there is remaining or not, of the user data to be recorded) (step S106). As a result, if it is determined that the recording is completed ("YES"), then the process is ended, on the other hand, if determining that it is not yet completed ("NO"), the process turns back to the step S103 mentioned above, thereby to repeat the processes mentioned above, again. And, if it is determined that the data mentioned above are not same to each other (i.e., there is an error ("YES")), then it is acknowledged as the defect block, and thereafter, the step is shifted into the alternation process "A", which will be mentioned in details hereinafter. After processing the alternation process "A", it is determined on whether further recording be conducted or not (step S106), and in case when it is determined to be completed ("YES")), the process is ended, but on the other hand, when it is determined not completed ("NO"), then the process turns back to the step S103 mentioned above, thereby to repeat the processes mentioned above, again.

Also, the operation will be shown in the center of FIG. 3 mentioned above, in case when determining that the optical disk 100, on which the user data are recorded, has the alternation areas provided on both sides, the inner/outer peripheries thereof (i.e., the innermost peripheral position and the outermost peripheral position), as the result of the above, but when the speed control be conducted under the CLV method. Thus, the operations from the recording of user data (step S103) to the determination of completion of the recording process (step S106) are same to those mentioned above. However, in this case, if determining that the data mentioned above are not same to each other (i.e., there is an error ("YES")), it is acknowledged as the defect block, in the similar manner to the above, but thereafter, the process moves to the alternation process "B" (step S120), the details of which will be mentioned below. After the alternation process "B", determination is made if further recording be conducted or not (step S106), and the process is ended when determining that it is completed ("YES"), on the other hand, when determining that it is not yet completed ("NO"), the process turns back to the step S103 mentioned above, thereby to repeat the processes mentioned above, again.

Further, the operation will be shown in the righthand side portion of FIG. 3 mentioned above, in case when determining that the optical disk 100, on which the user data are recorded, has only the alternation area provided on the innermost peripheral position (see FIG. 2(A) mentioned above). Thus, in this case, also the operations from the recording of user data (step S103) to the determination of completion of the recording process (step S106) are conducted, in the similar manner as was mentioned above. However, if determining that there is no such the sameness between the recorded data (i.e., there is an error ("YES")), i.e., being acknowledged as the defect block, thereafter the process moves into the alternation process "C"(step S130), the details of which will be mentioned below. After the alternation process "C", determination is made if further recording be conducted or not (step S106), and the process is ended when determining that it is completed ("YES"), on the other hand, when determining that it is not yet completed ("NO"), the process turns back to the step S103 mentioned above, thereby to repeat the processes mentioned above, again.

Following to the above, the details of the alternation process "A" (i.e., the step S110) shown in FIG. 3 will be shown, as well as, explaining the principle thereof, by referring to FIG. 4 attached herewith. This alternation process "A" is the process for shortening the time necessary for the alternation process, by appropriately determining the alternation destination to the inner periphery or the outer periphery, depending upon the position where the alternation origin is recorded, as was mentioned above.

Thus, under the CAV method (recording) of keeping the rotation speed of the disk constant, since there is no necessity of the rotation speed control of the disk motor 300, then rather a slider movement time comes to be dominant, i.e. the time necessary for moving the optical pickup 200 through the slide motor 320. For that reason, apparently from a viewpoint of time, it is advantageous in such the case that selection is made on the alternation destination nearer from the present recording position, i.e., the position of the alternation origin, between the alternation areas which are provided on the innermost and outermost peripheries of the optical disk 100. Then, according to the present invention, an intermediate position "$r_{mid}$" is determined within the data area where the user can record, which is defined between those innermost and outermost peripheries, and determination is made on which side the present recording position, i.e., the position of the alternation origin is near to, comparing it to that intermediate position "$r_{mid}$" (step S111). As a result, when it is determined that the position of the alternation origin is larger than the intermediate position "$r_{mid}$" (i.e., being located in an outside), then the alternation destination is distributed or assigned to the alternation area on the outer periphery side (step S112); on the other hand, when it is determined that the position of the alternation origin is smaller than the intermediate position "$r_{mid}$" (i.e., being located in an inside), then the alternation destination is distributed or assigned to the alternation area on the inner periphery side (step S113). However, this intermediate position "$r_{mid}$" of the area can be obtained, such as, $(r_{in}+r_{out})/2=(24+58)/2=41$ mm, from an average between the inner peripheral radius 24 mm and the outer peripheral radius 58 mm, in the case of BD, for example.

Figure 7:
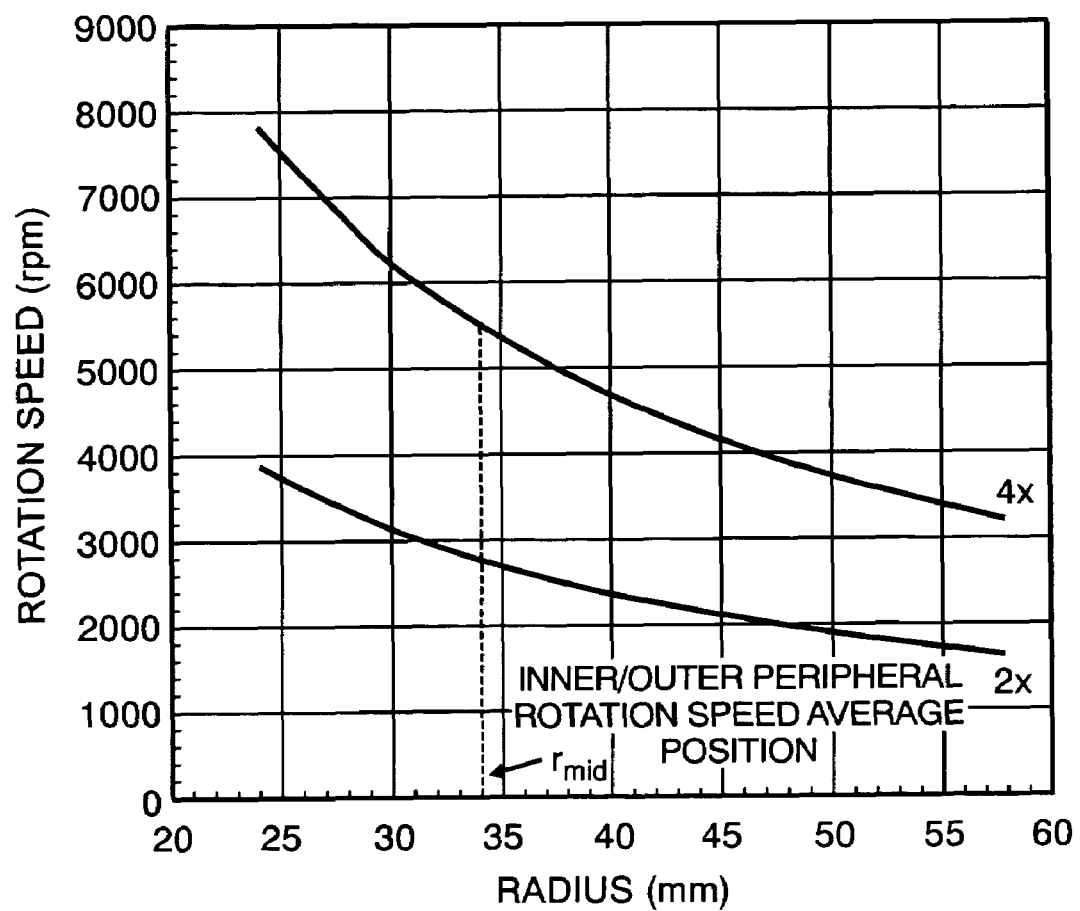
FIG. 7 is a view for explaining the principle of the alternation process "B" mentioned above.

Next, FIG. 5 attached herewith shows the details of the alternation process "B" (step S120) shown in FIG. 3 mentioned above, and also explanation will be made blow on the principle of thereof, by referring to FIG. 7 attached. However, this alternation process "B" is also the process for shortening the time necessary for the alternation process, by appropriately determining the alternation destination to the inner periphery or the outer periphery, depending upon the position where the alternation origin is recorded, as was mentioned above; however it differs from the alternation process "A" (step S110) mentioned above, in particular, in an aspect of applying therein the CLV method of keeping the linear speed of the disk constant.

In this CLV method, for keeping the linear speed of the disk constant, in addition to the slider movement time mentioned above, there is further necessity of a time for controlling the rotation speed of the disk motor 300, by taking the inertia caused due to the disk into the consideration. Thus, in such the case, it can be seen that the time for setting the spindle, i.e., the rotation speed control of the disk motor comes to be dominant, and for that reason, when recording under the CLV, it is advantageous to distribute the alternation destination to the inner periphery or the outer periphery, upon basis of the position where the rotation speed comes to be an average rotation speed between the inner periphery and the outer periphery of the disk; i.e., "inner/outer peripheral rotation speed average position $(r_{av})$".

In more details, under the CLV method (recording), as is shown in FIG. 6, for example, the rotation speed (on the vertical axis) differs depending on the radius position (on the horizontal axis) of the disk, and it differs depending upon the drive speed (in this case, there are shown examples of the double-speed (2×) and the quad-speed (4×)). And, the linear velocity on the BD of 25 GB is 4.917×4=19.668 m/s, for example, and the rotation speed at the innermost periphery 24 mm on the data area thereof is $19.688/(2\pi \times 24e^{-3})=130.427$ (Hz) while the rotation speed at the outermost periphery 58 mm thereof is $19.688/(2\pi \times 58e^{-3})=53.97$ (Hz). Then, the average between those rotation speeds at the innermost periphery and the outermost periphery is $(130.427+53.97)/2=92.199$ (Hz), and the radius position corresponding to this averaged rotation speed is $19.668/(2\pi \times 92.199)=33.95$ mm (see "inner/outer peripheral rotation speed average position $(r_{av})$" in FIG. 7.

Then, according to the present invention, the "inner/outer peripheral rotation speed average position ($r_{av}$)" is determined as was mentioned above, and determination is made on which one side the present recording position, i.e., the position of the alternation origin is nearer to, comparing to that "inner/outer peripheral rotation speed average position ($r_{av}$)" (step S121). As a result, when it is determined that the position of the alternation origin is larger than the "inner/outer peripheral rotation speed average position ($r_{av}$)" (i.e., being located in an outside), then the alternation destination is distributed or assigned to the alternation area on the outer periphery side (step S122); on the other hand, when it is determined that the position of the alternation origin is smaller than the "inner/outer peripheral rotation speed average position ($r_{av}$)" (i.e., being located in an inside), then the alternation destination is distributed or assigned to the alternation area on the inner periphery side (step S123). With this, it is possible to shorten the time necessary for the alternation process. Although only the examples are shown about the double-speed (2×) and the quad-speed (4×) in this embodiment, however the present invention should not restricted only to this, but may be applied into the cases of other drive speed, and it is apparent that the "inner/outer peripheral rotation speed average position ($r_{av}$)" maybe obtained in the similar manner as was mentioned above, even in such the case.

Further, FIG. 6 attached herewith shows the details of the alternation process "C" (step S130) shown in FIG. 3 mentioned above, and also explanation will be made blow on the principle of thereof, by referring to FIG. 8 attached. However, in this alternation process "C", as was mentioned above, the optical disk 100 is the disk having the alternation area only at the innermost peripheral position thereof (see FIG. 2(A) mentioned above). For that reason, under the CAV method of keeping the rotation speed of the disk constant, there is no necessity of rotation speed control of the disk motor 300, and for that reason is taken into the consideration only the slider movement time for moving the optical pickup 200 by means of the slide motor 320 mentioned above.

Figure 8:
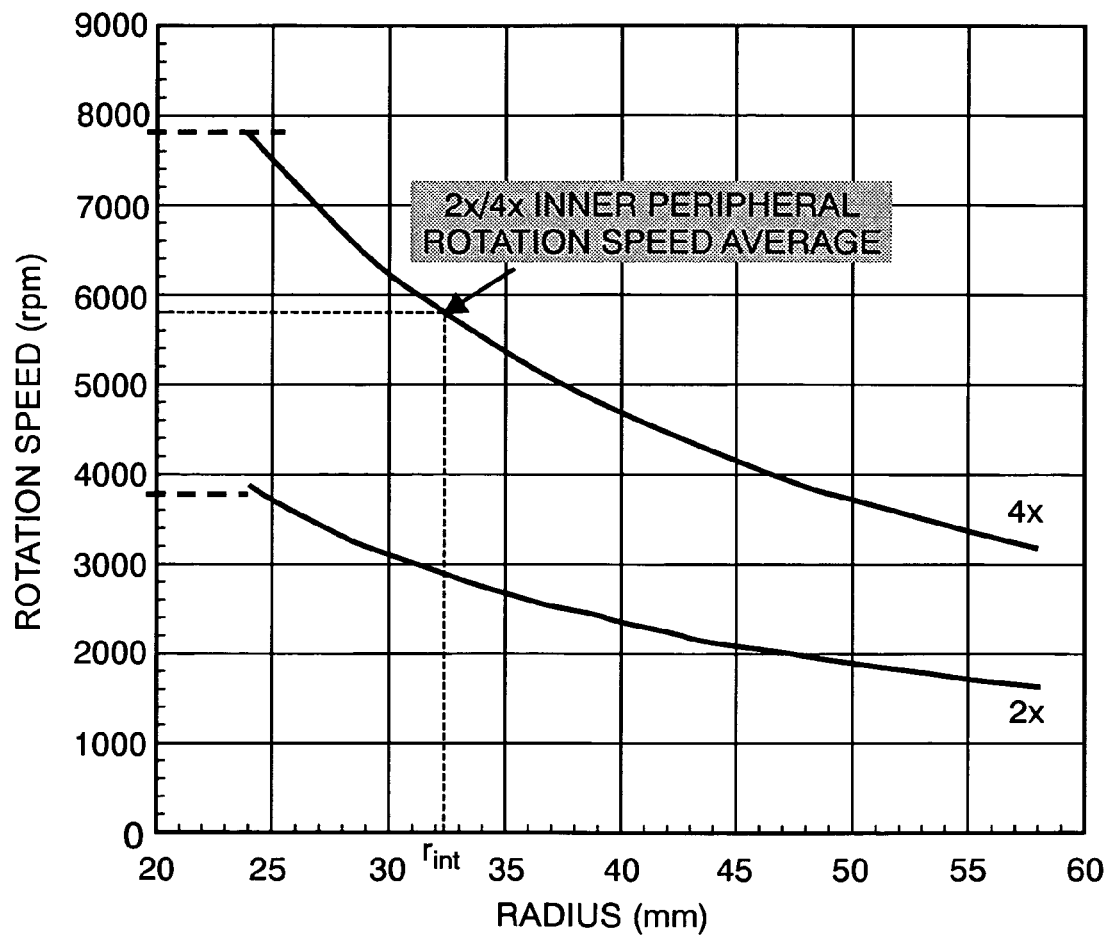
FIG. 8 is a view for explaining the principle of the alternation process "C" mentioned above.

However, under the CLV method of keeping the linear speed of the disk constant, there may be causes a large difference between the rotation speeds, depending upon the alternation destinations, i.e., the radius position of the alternation destination, as shown in FIG. 8 (for example, in case where the defect flock is in an outer periphery side of the user data area on the disk when rotating at the quad-speed (4×)). Then, in this case, an average is obtained of the rotation speed on the inner periphery at the double-speed (2×) or the quad-speed (4×) (i.e., a "drive speed inner peripheral rotation speed average"), and a position is obtained, corresponding to that "drive speed inner peripheral rotation speed average" on the radius (i.e., a "drive speed inner peripheral rotation speed average position ($r_{int}$)"), thereby to determine the rotation speed (i.e., the drive speed) at the alternation destination upon basis of this "drive speed inner peripheral rotation speed average position ($r_{int}$)".

Thus, as is shown in the figure, determination is made on if the present recording position, i.e., the position of the alternation origin is equal or larger than the "drive speed inner peripheral rotation speed average position ($r_{int}$)" (step S131). As a result, when it is determined that the position of the alternation origin is equal or larger than the "drive speed inner peripheral rotation speed average position ($r_{int}$)" (YES), the rotation speed of the disk is set to the double-speed (2×) during the alternation process. On the other hand, when determining that the position of the alternation origin less than the "drive speed inner peripheral rotation speed average position ($r_{int}$)" (NO), then the rotation speed of the disk is set to the quad-speed (4×) during the alternation process. Thus, with doing this, even in the case where the defect block appears during the recording operation at the quad-speed (4×) on the outer periphery side of the user data area, as was mentioned above, it is possible to suppress the change or fluctuation of rotation of the disk motor to be small, by brining the rotation speed of the disk down to the double-speed (2×) during the alternation process, and thereby enabling to shorten the time necessary for the alternation process. Although, the explanation was given about only the example of the double-speed (2×) and the quad-speed (4×) in the above, however for the person skilled in the art, it is apparent that the present invention is applicable into the cases of other drive speeds than that.

As was apparent from the above-mentioned, according to the present invention, it is possible to achieve an superior effect of shortening the time necessary for the alternation process, by determining the alternation destination or the recoding speed depending on the position recording the alternation origin, on the disk having the alternation area(s) provide on the inner and/or outer periphery thereof, comparing to the manner of the conventional arts that the alternation area is determined, automatically, but not depending on the position recording the alternation origin.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A disk recording/reproducing apparatus, for recording or reproducing information onto an optical disk, with conducting an alternation process upon a defect block within a user data recording area on the optical disk, comprising:
    a disk rotator which rotates the optical disk;
    an optical pickup which irradiates a light upon a recording surface of the optical disk and which receives a reflection light thereof, so as to conduct recording or reproducing of data onto the recording surface of the optical disk;
    a slide motor which moves the optical pickup into a radial direction of the optical disk; and
    a controller which controls at least the disk rotator and the slide motor in accordance with a signal obtained from the optical pickup,
    wherein the controller determines an alternation destination for recording data at an alternation origin therein during the alternation process depending on a radial position of the alternation origin on the optical disk and a reference radial position on the optical disk which is at a position other than a position of an alternation area on the optical disk, when the optical disk has the alternation area on an innermost periphery and an outermost periphery, and the recording/reproducing apparatus conducts the alternation process upon detection of a defect block within a user data recording area on the optical disk, thereby conducting the alternation process thereon.

2. The disk recording/reproducing apparatus, as is described in the claim 1, wherein the controller determines the alternation destination for recording data at an alternation origin therein, depending on the position of the alternation origin, upon basis of an intermediate position ($r_{mid}$) of the optical disk, when the optical disk loaded into the apparatus has the alternation areas on an innermost periphery and an outermost periphery thereof, and the alternation process is conducted with CAV recording thereon.

3. The disk recording/reproducing apparatus, as is described in the claim 1, wherein the controller determines the alternation destination for recording data at an alternation origin therein, depending on the position of the alternation origin, upon basis of an inner/outer peripheral rotation speed average position ($r_{av}$) of the optical disk, when the optical disk loaded into the apparatus has the alternation areas on an innermost periphery and an outermost periphery thereof, and the alternation process is conducted with CLV recording thereon.

4. The disk recording/reproducing apparatus, as is described in the claim 1, wherein the controller determines the drive speed during the alternation process, depending on the position of the alternation origin, upon basis of a drive speed inner peripheral rotation speed average position ($r_{int}$) of the optical disk, when the optical disk loaded into the apparatus has the alternation area only on an innermost periphery thereof, and the alternation process is conducted with CLV recording thereon.

5. The disk recording/reproducing apparatus of claim 1, wherein the controller determines a drive speed during the alternation process depending on the radial position of the alternation origin on the optical disk and the reference radial position on the optical disk, when the disk recording/reproducing apparatus conducts the alternation process upon detection of a defect block within a user data recording area on the optical disk, thereby conducting the alternation process thereon.

6. The disk recording/reproducing apparatus of claim 5, wherein the disk recording/reproducing apparatus reduces the recording/reproducing speed when the alternation origin is outer than a drive speed inner peripheral rotation speed average position ($r_{int}$) of the optical disk, when the optical disk loaded into the apparatus has the alternation area only on an innermost periphery thereof and the alternation process is conducted with CLV recording thereon.

7. The disk recording/reproducing apparatus of claim 1, wherein the reference radial position on the optical disk differs according to whether the alternation process is conducted with CAV recording or CLV recording.

8. The disk recording/reproducing apparatus of claim 1, wherein the disk recording/reproducing apparatus reduces a recording/reproducing speed when the alternation origin is outer than a drive speed inner peripheral rotation speed average position ($r_{int}$) of the optical disk, when the optical disk loaded into the apparatus has the alternation area only on an innermost periphery thereof, and the alternation process is conducted with CLV recording thereon.

9. The disk recording/reproducing apparatus as is described in the claim 1, wherein the controller configures the reference radial position on the optical disk depending on whether the alternation process is conducted with CAV recording thereon or CLV recording thereon.

10. An alternation process method for an optical disk, enabling to record data in a defect block within a user data recording area of the optical disk into an alternation area thereof, comprising the following steps of:
 a step of obtaining a position of an alternation origin on the optical disk, when detecting the defect block within the user data recording area of the disk;
 a step of determining an alternation destination where the data of the alternation origin are recorded therein, during the alternation process, upon basis of a radial position of the alternation origin on the optical disk and a reference radial position on the optical disk which is at a position other than a position of an alternation area on the optical disk, when the optical disk has the alternation area on an innermost periphery and an outermost periphery, being obtained in the above-mentioned step; and
 a step of conducting the alternation process at the alternation destination, during the alternation process, being determined in the above-mentioned step.

11. The alternation process method for an optical disk, as is described in the claim 10, wherein the alternation destination for recording data at an alternation origin therein is determined depending on the position of the alternation origin, upon basis of an intermediate position ($r_{mid}$) of the optical disk, when the optical disk loaded into an apparatus has the alternation areas on an innermost periphery and an outermost periphery thereof, and the alternation process is conducted with CAV recording thereon.

12. The alternation process method for an optical disk, as is described in the claim 10, wherein the alternation destination for recording data at an alternation origin therein is determined depending on the position of the alternation origin, upon basis of an inner/outer peripheral rotation speed average position ($r_{av}$) of the optical disk, when the optical disk loaded into the apparatus has the alternation areas on an innermost periphery and an outermost periphery thereof, and the alternation process is conducted with CLV recording thereon.

13. The alternation process method for an optical disk, as is described in the claim 10, wherein the drive speed during the alternation process is determined depending on the position of the alternation origin, upon basis of a drive speed inner peripheral rotation speed average position ($r_{int}$) of the optical disk, when optical disk loaded into the apparatus has the alternation area only on an innermost periphery thereof, and the alternation process is conducted with CLV recording thereon.

14. The alternation process method for an optical disk of claim 10, wherein a recording/reproducing speed during the alternation process is determined depending on the radial position of the alternation origin on the optical disk and the reference radial position on the optical disk, being obtained in the above mentioned-step.

15. The alternation process method for an optical disk of claim 10, wherein the reference radial position on the optical disk differs according to whether the alternation process is conducted with CAV recording or CLV recording.

16. The alternation process method for an optical disk, as is described in the claim 10, wherein the reference radial position on the optical disk is configured depending on whether the alternation process is conducted with CAV recording thereon or CLV recording thereon.

17. A disk recording/reproducing apparatus for recording or reproducing information onto an optical disk, with conducting an alternation process upon a defect block within a user data recording area on the optical disk, comprising:
 a disk rotator which rotates the optical disk;
 a slide motor which moves the optical pickup into a radial direction of the optical disk; and
 a controller which controls at least the disk rotator and the slide motor upon basis of a signal obtained from the optical pickup,
 wherein, when the optical disk loaded into the apparatus has the alternation areas on an innermost periphery, the disk recording/reproducing apparatus conducts the alternation process upon the alternation areas on the innermost periphery when the alternation origin is inner than a reference radial position on the optical disk which is at a position other than a position of the alternation areas on the optical disk, and conducts the alternation process upon the alternation areas on outermost periphery when the alternation origin is outer than the reference radial position on the optical disk.

18. The disk recording/reproducing apparatus of claim 17, wherein the reference radial position on the optical disk is an intermediate position ($r_{mid}$) of the optical disk, when alternation process is conducted with CAV recording thereon.

19. The disk recording/reproducing apparatus of claim 13, wherein the reference radial position on the optical disk is an inner/outer peripheral rotation speed average position ($r_{av}$) of the optical disk, when alternation process is conducted with CLV recording thereon.

20. The disk recording/reproducing apparatus, as is described in the claim 17, wherein the disk recording/reproducing apparatus configures the reference radial position on the optical disk depending on whether the alternation process is conducted with CAV recording thereon or CLV recording thereon.

21. An alternation process method for an optical disk, enabling to record data in a defect block within a user data recording area of the disk into an alternation area thereof, comprising the following steps of:
 a step of obtaining a position of an alternation origin on the optical disk, when detecting the defect block within the user data recording area of the optical disk; and
 a step of conducting the alternation process upon the alternation areas on the innermost periphery when the alternation origin is inner than a reference radial position on the optical disk which is at a position other than a position of the alternation areas on the optical disk, and conducting the alternation process upon the alternation areas on outermost periphery when the alternation origin is outer than the reference radial position on the optical disk, when the optical disk loaded into the apparatus has the alternation areas on an innermost periphery and an outermost periphery.

22. The alternation process method for an optical disk, as is described in the claim 21, wherein the reference radial position on the optical disk is an intermediate position ($r_{mid}$) of the optical disk, when the alternation process is conducted with CAV recording thereon.

23. The alternation process method for an optical disk, as is described in the claim 21, wherein the reference radial position on the optical disk is an inner/outer peripheral rotation speed average position ($r_{vy}$) of the optical disk, when alternation process is conducted with CLV recording thereon.

24. The alternation process method for an optical disk, as is described in the claim 21, wherein the reference radial position on the optical disk is configured depending on whether the alternation process is conduced with CAV recording thereon or CLV recording thereon.

* * * * *